United States Patent

Hofmann

[15] 3,670,248

[45] June 13, 1972

[54] METHOD AND APPARATUS FOR CONVERTING MULTI-PULSE COMMANDS INTO COMMAND UNITS FOR TRANSMISSION

[72] Inventor: Fritz Hofmann, Munich, Germany

[73] Assignee: Messerschmitt-Bolkow Gesellschaft mit beschrankter Haftung, Ottobrunn near Munich, Germany

[22] Filed: July 9, 1969

[21] Appl. No.: 840,412

[30] Foreign Application Priority Data

July 18, 1968 Germany ......................P 17 63 685.0

[52] U.S. Cl. ............................325/141, 325/143, 179/15.55

[51] Int. Cl. ..........................................................H04b 1/04

[58] Field of Search ....................325/143, 38; 340/167, 168; 179/15.55

[56] References Cited

UNITED STATES PATENTS

| | | | |
|---|---|---|---|
| 3,053,478 | 9/1962 | Davenport et al. | 340/167 |
| 3,344,231 | 9/1967 | Dodd et al. | 179/15.55 |
| 3,378,641 | 4/1968 | Varsos et al. | 179/15.55 |
| 3,414,677 | 12/1968 | Quinlan | 179/15.55 |

*Primary Examiner*—Richard Murray
*Attorney*—McGlew and Toren

[57] ABSTRACT

In a method of transmitting cyclically formed commands, in the form of individual pulses, over a transmission channel which is restricted in its transmission capacity, security against interference, or both, the individual pulses are combined to form larger command units which units are cyclically transmitted. The balance of pulses remaining within a transmission cycle, during formation of the larger command units, is transferred to the respective following transmission cycle. The apparatus includes an input buffer providing an output command in the form of a number of individual pulses related to a certain time period. A first gate circuit connects the buffer with the forward-counting input of a forward-backward counter, and the counter is connected, through a second gate circuit and an output amplifier, with a transmitter forming the input of a transmission channel. The output of the second gate circuit is connected, through a restoring buffer, with the backward-counting input of the counter. The two buffers and the two gate circuits are controlled by a common timing stage, with the respective timing sequences for the individual components being coordinated in a selected manner.

8 Claims, 5 Drawing Figures

INVENTOR.
FRITZ HOFMANN
BY
John J. McGlew
ATTORNEY

INVENTOR.
FRITZ HOFMANN
BY John J. McGlew
ATTORNEY

METHOD AND APPARATUS FOR CONVERTING MULTI-PULSE COMMANDS INTO COMMAND UNITS FOR TRANSMISSION

BACKGROUND OF THE INVENTION

The invention is directed to a method and apparatus with the transmission of cyclically formed commands, present in the form of individual pulses, over a transmission channel that is restricted in its transmission capacity and/or security against interference. In these transmission arrangements, a pulse modulation is used, wherein the information to be transmitted is given by the number of pulses transmitted during a certain period, known as a scanning cycle, and this number being selected from a maximum possible number of pulses. Thus, a preferably uniformly distributed pulse screen wherein, depending on the contents of the information, a certain number, between zero and the maximum possible number of the individual pulses provided by the screen, is occupied with pulses to be transmitted, is utilized.

Such transmission arrangements are used, for example, in the wireless transmission of commands to guided missiles, wherein a guiding signal from a ground station must be transmitted to the missile. Particularly in military missiles, maximum security against interference in this wireless transmission of commands must be insured in order to enable satisfactory guiding of the missile from the ground station even in the case of aimed interference measures on the part of the enemy.

This requirement of maximum security against interference in the transmission of commands by the above-described pulse modulation is met by providing the receiver of the missile with a so-called receiver gate, which opens briefly only at the times predetermined by the pulse screen, but remains closed during other times. The value of the respective transmitted order is determined, in the missile, from the number of pulses received during these opening periods of the receiver gate, as determined by the pulse screen. The maximum value therefore will be transmitted when a pulse is received during each opening period of the receiver gate during a scanning cycle. The lowest value, which corresponds to the value "0", results, when no pulse is received by the missile during any of the opening periods of the receiver gate.

In order to be able to determine a fine distinction between individual command values to be transmitted, a correspondingly large maximum possible number of pulses is provided during a scanning cycle. However, the screen thus becomes so fine, that a uniform number of opening periods of the receiver gate is confined to one scanning cycle, so that the ratio of the closing periods to the opening periods, of the receiver gate, becomes correspondingly low. Nevertheless, for security against interference, it is desirable to make this ratio as high as possible, and to distribute the information to be transmitted, that is, the command value, over the opening periods of the receiver gate in such a way that actually a part of the command value is transmitted to the missile with each opening of the receiver gate.

SUMMARY OF THE INVENTION

As stated, this invention is directed to the transmission of cyclically formed commands in the form of individual pulses and, more particularly, to an improved method of and apparatus for such transmission.

The objective of the invention is to provide a transmission method and apparatus by means of which commands can be transmitted, from a transmitter, to a receiver, with minimum requirements and with optimum security against interference. The apparatus is a simple and reliable device for performing the method.

Starting from a method for the transmission of cyclically formed commands, which are present in the form of individual pulses, over a transmission channel restricted in its transmission capacity and/or security against interference, the problem is solved by the present invention in that the individual pulses first are combined to form larger units and then these larger units are transmitted cyclically.

In accordance with the invention, the individual pulses, obtained during a scanning cycle and whose number indicates the respective command for this cycle, are combined, for example, by integration, and transmitted during certain periods, determined by a new scanning cycle, as pulses of a much smaller number but a higher evaluation weight, over the transmission channel.

In accordance with another feature of the invention, the balance of individual pulses remaining during formation of larger units within one transmission cycle is transferred to the respective following transmission cycle. This transfer of individual pulses, during the transmission of a larger unit, to the following transmission cycle assures that actually the higher value command unit is transmitted during a finite time, even if a certain displacement of a certain part of the respective command appears in the following transmission cycle. Such a displacement of a part of the command to a somewhat later period is always harmless when an integration of individual pulses occurs, in any event, over a longer period of time, during the execution of the command indicated by the respective command value. Such an integration appears, for example, in the guidance of a missile where individual commands transmitted to the missile are integrated over a part of the flying time and over its kinematics to the flight path commanded by the respective command.

The transmission cycle can be displaced, with respect to the scanning cycle determinant for the formation of the command, in phase and selected to have a different period for its duration. Preferably, the transmission cycle is shorter than the scanning cycle, so that a certain number of transmission cycles corresponds to a scanning cycle required for the formation of the respective command. In accordance with the preferred embodiment of the invention, the individual pulses are therefore distributed uniformly over the cycle time of the command formation, and/or the cycle time of the transmission. Such a uniform distribution assures that a substantially uniform integration of the individual pulses will take place, so that substantially uniform integration values are called by the transmission cycle even with several interrogations falling within a scanning cycle for the formation of a command.

In accordance with another feature of the invention, an apparatus for performing the method comprises an input buffer, at the output of which appears a command value in the form of a number of individual pulses related to a certain time period, and a first gate circuit which connects the input buffer with the forward counting input of a forward-backward counter. The counter is connected, through the medium of a second gate circuit and an output amplifier, with a transmitter forming the input of the transmission channel. The output of the second gate circuit is connected, through a restoring buffer, with the backward-counting input of the forward-backward counter. The input buffer, the first and second gate circuits, and the restoring buffer are controlled by a common timing stage, timing sequences transmitted to the individual components being geared down to a certain extent relative to each other.

The individual pulses, arriving at the input of the first gate circuit and indicating the respective command value, are distributed, by the first gate circuit, substantially uniformly over the respective scanning cycle and are integrated, by addition, in the forward-backward counter. At certain times, which are determined by the transmission cycle, the second gate circuit opens and calls a certain number of individual pulses in the forward-backward counter. These are combined to a larger unit. The second gate circuit thus emits, at these times, a pulse which has the weight of several individual pulses stored in the counter. This pulse, corresponding to the so-called larger unit, is transmitted over the transmitter to the transmission channel. At the same time, the pulse arrives in the restoring buffer, which resolves the pulse again into several individual pulses, corresponding to its weight, and which transmits the individual pulses to the backward-counting input of the forward-backward counter. Thus, the latter reduces its respective reading by the number of individual pulses combined to form a larger unit. The remaining counter content is thus automatically transferred to the respective following transmission cycle.

An object of the invention is to provide a method for the transmission of cyclically formed commands, present in the form of individual pulses, over a transmission channel which is restricted in its transmission capacity, security against interference, or both.

Another object of the invention is to provide an improved apparatus for performing the method.

A further object of the invention is to provide such a method and apparatus in which the individual pulses are first combined into larger units and then transmitted cyclically.

Another object of the invention is to provide such a method and apparatus in which individual pulses, obtained during a scanning cycle and whose number indicates the respective command value for the scanning cycle, are combined by integration and transmitted during certain periods determined by a new scanning cycle, as pulses of a much lower number but higher evaluation weight, the transmission being effected over the transmission channel.

A further object of the invention is to provide such a method and apparatus in which the balance of individual pulses, remaining during the formation of larger units within a transmission cycle, is transferred to the respective following transmission cycle.

Another object of the invention is to provide such a method and apparatus in which the transmission cycle can be displaced with respect to the scanning cycle, determinant for the formation of the command, in phase and also selected to have a different time duration.

A further object of the invention is to provide such a method and apparatus in which the individual pulses are distributed uniformly over the cycle time of the command formation, the cycle time of the transmission, or both cycle times.

Another object of the invention is to provide such a method and apparatus in which the transmission cycle is shorter than the scanning cycle so that a certain number of transmission cycles corresponds to the scanning cycle which is required for the formation of the respective command value.

For an understanding of the principles of the invention, reference is made to the following description of a typical embodiment thereof as illustrated in the accompanying drawings.

DESCRIPTION OF THE PREFERRED EMBODIMENT

Figure 1:
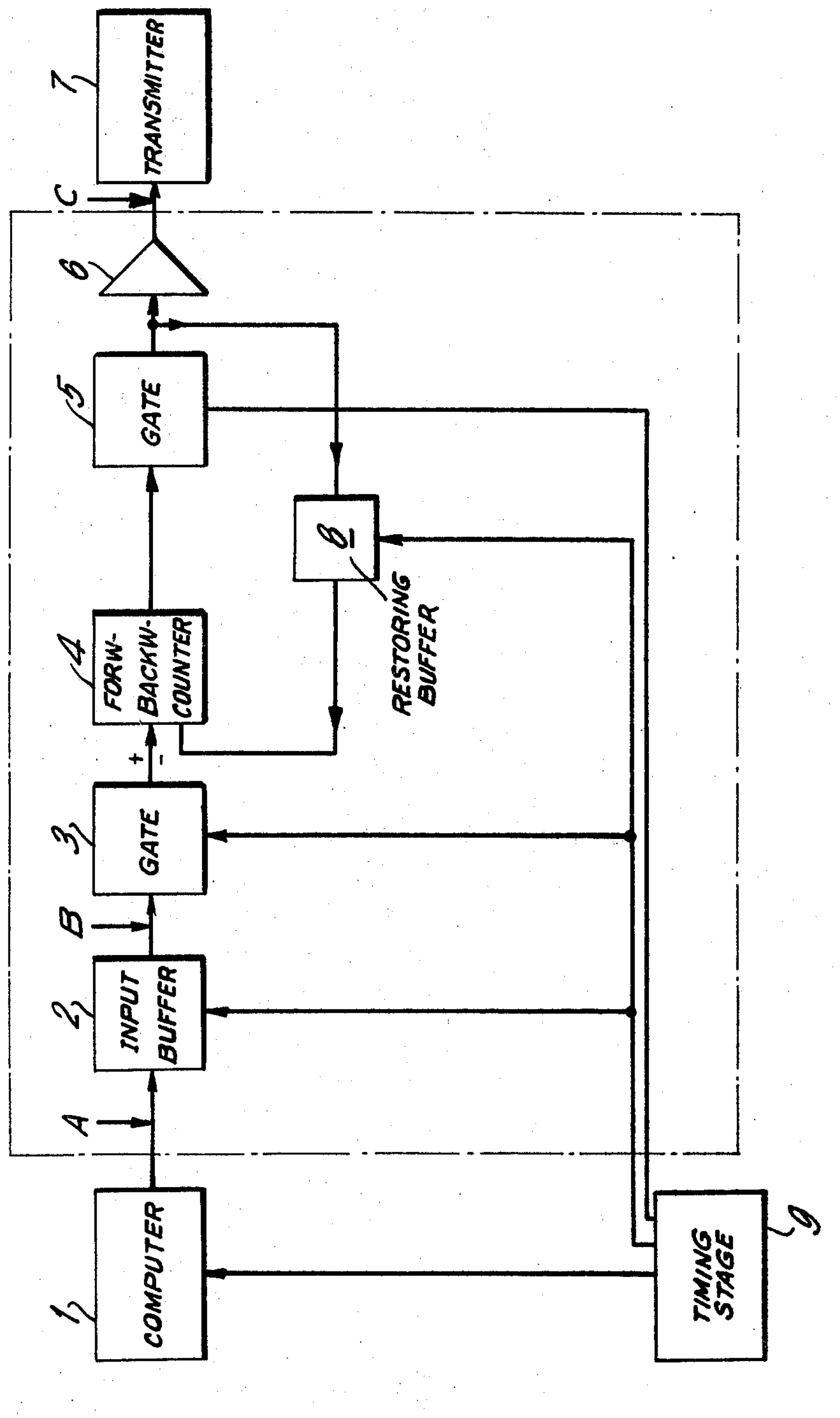
FIG. 1 is a block circuit diagram of apparatus for performing the method of the invention.

Referring first to FIG. 1, the command value, formed by means of a computer 1, arrives in an input buffer 2 in which the respective command value is transformed, in a known manner, into a certain number of pulses indicating the size of the command value. By means of a gate circuit 3, these pulses are distributed substantially uniformly over a period determined by the respective scanning cycle, and are fed continuously into a forward-backward counter 4. Through a second gate circuit 5, a certain number of individual pulses is called, at certain times, from counter 4 and transmitted in the form of a pulse through an output amplifier 6 to a transmitter 7 which transmits the pulse to a transmission channel which has not been represented.

The output of gate circuit 5 is also connected to the input of a restoring buffer 8, in which the pulse emitted from gate circuit 5 is resolved into the respective predetermined number of individual pulses which were combined to form a single pulse during passage from counter 4 to gate circuit 5. The restoring buffer 8 controls the backward-counting input of counter 4, so that the respective counter content is reduced by the corresponding number of individual pulses. Input buffer 2, gate circuit 3, gate circuit 5 and restoring buffer 8 are controlled by a common timing stage 9 whose individual outputs are geared down, relative to each other in their pulses, in a manner which has not been shown. Thus, the opening periods of gate circuit 5, indicating the transmission cycle, need not necessarily coincide with the opening periods of gate circuit 3, and can also differ in their frequency.

The components 1 through 9, illustrated in FIG. 1, can comprise simple electrical and electronic sub-assemblies well known to those skilled in the art. Solely by way of example, gate circuit 3 may comprise a plurality of AND members, the number of which must correspond to the maximum possible number of pulses of a scanning cycle. Again solely by way of example, if the maximum possible number of pulses in a cycle is chosen to be nine, these pulses are uniformly distributed throughout the scanning cycle by the input buffer 2 which controls the AND members of gate circuit 3, and which may comprise, for example, a known slide register.

Assuming, in the selected example of nine pulses per scanning cycle, that the AND members of gate circuit 3 are numbered consecutively, the slide register of input buffer 2 triggers one input of each AND member in a sequence starting with the fifth AND member and following consecutively with the third, seventh, ninth, first, eighth, second, sixth and fourth AND members. Thus, the nine possible pulses in a scanning cycle will be distributed uniformly between the nine AND members of the gate circuit 3.

The several AND members of gate circuit 3 are then switched through consecutively by the pulse beat generated by timing stage 9 and corresponding to the pulse pattern of the scanning signal, the timing pulses triggering the other input of each AND member of gate circuit 3 sequentially beginning with the first gate circuit and ending with the ninth, and repetitively. An output pulse appears in the output line of gate circuit 3, which is connected to the outputs of all of the AND members, only when a signal from input buffer 2 appears at an AND member simultaneously with a beat pulse from timing stage 9.

The pulses, thus uniformly distributed by the gate circuit 3 throughout one scanning cycle, reach forward-backward counter 4 and are counted thereby. When counter 4 reaches a counter state equal to or greater than "4", a signal then reaches, through the output lines of counter 4, which may be combined by an OR member and which correspond to a counter state of "4" or more, a further AND member which is simultaneously controlled by a transfer pulse. In this manner, there appears, at the output of gate circuit 5, a signal pulse whenever counter 4 has reached a counter state of "4" or more and whenever the transfer beat pulse is applied to gate circuit 5. In a manner described hereinafter, this signal pulse corresponds, for example, to seven original signal pulses emitted by input buffer 2 and, as may be seen in FIG. 1, is transmitted to the transmission line through transmitter 7.

In addition, this signal pulse is applied to return buffer 8 which may be designed, for example, in the form of a ring counter or a back fed slide register. If this ring counter has seven counting stages, by way of example, it emits, when controlled by the signal pulse appearing at the output of gate circuit 5, seven individual pulses applied to counter 4 through its backward counting input. The forward-backward counter 4 is thus turned back by "7" by these seven individual pulses.

Figures 2A, 2B, 2C, 2D:
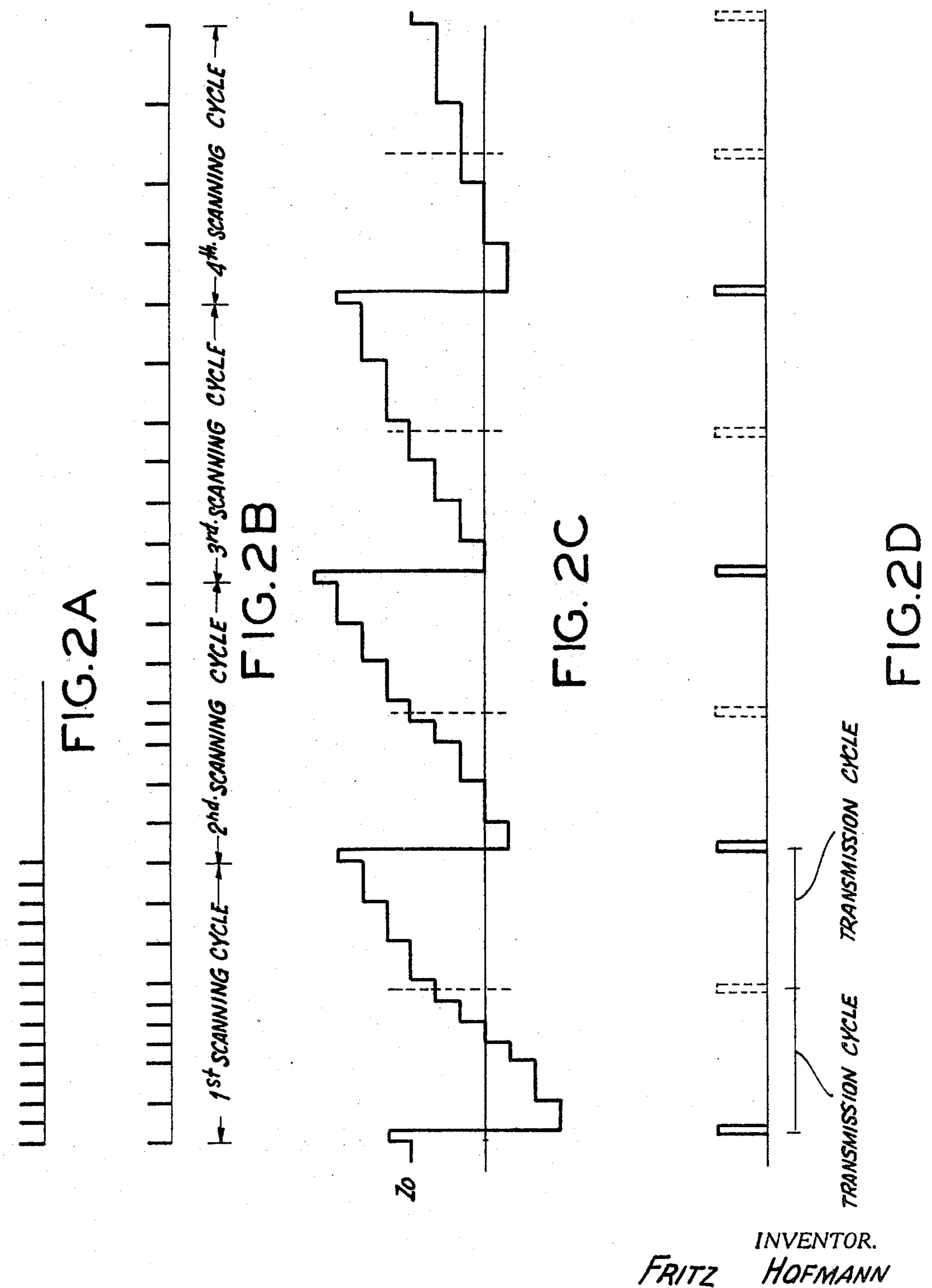
FIGS. 2A–2D are pulse sequences illustrating the transmission method in accordance with the invention.

The operation of the apparatus shown in FIG. 1, and the method of operation in accordance with the invention, will now be described more fully with reference to the pulse sequences as shown in FIGS. 2A–2D. The pulse raster or scanning cycle is indicated in FIG. 2A, and shown as consisting, by way of example, of 14 individual pulses appearing during a scanning cycle. The maximum possible command value therefore is indicated by 14 individual pulses appearing during such a scanning cycle. The different command values, appearing during four successive scanning cycles, are indicated in FIG. 2B. The first scanning cycle includes nine pulses, the second scanning cycle includes eight pulses, the third scanning cycle includes six pulses and the fourth scanning cycle includes four pulses. In each case, the individual pulses are distributed as uniformly as possible throughout their respective scanning cycle, but each individual pulse must be fitted into the pulse sequence or scanning cycle indicated in FIG. 2A. The individual pulses indicated in FIG. 2B thus are the pulses appearing, for example, at the gate circuit 3, and which are added in counter 4.

The method of operation of counter 4 is indicated in FIG. 2C, as starting, at the beginning of the first scanning cycle shown at in FIG. 2B, with an initial counter reading Zo which corresponds, in the illustrated example, to three individual pulses. Counter 4 attains a reading "4" after the first individual pulse of the first scanning cycle has been added to the counter reading. Immediately thereafter, gate circuit 5 opens in order to call a certain number of individual pulses from the counter content during a transmission cycle. In the selected example, seven individual pulses stored in counter 4 are combined to a larger unit, as indicated in FIG. 2D, and this larger unit is then transmitted, in the form of a new pulse, over transmitter 7 to the transmission channel.

Since the counter has reached, at this time, a counter reading of "4", and as the calling mechanism is so designed that, with each possible call of seven individual pulses, the remaining counter reading is to come as close as possible to the value "0", seven individual pulses are called and combined to form the new pulses represented in FIG. 2D. This new pulse is again resolved, in restoring buffer 8, into seven individual pulses in order to set counter 4, through its backward-counting input, to a new counter-reading of "—3".

The individual pulses fed, during the first scanning cycle, continuously to the counter 4, are added up in the manner represented in FIG. 2C. During the next opening period of gate circuit 5, determined by the transmission cycle, counter 4 has reached a counter reading of "2", which is too low, however, for a call of seven individual pulses. Thus, despite opening of gate circuit 5, no pulse is transmitted to the transmission channel.

Due to the further addition of individual pulses, the counter reading continues to rise or increase, so that, in the next transmission cycle, a pulse forming a larger unit is again emitted to transmitter 7, and this sets back counter 4, in the manner described above and through restoring buffer 8, for example to "—1".

As can be seen from FIGS. 2A–2D, the individual pulses appearing within the individual scanning cycles are added up continuously in counter 4, and combined, during the opening periods of gate circuit 5, to form larger units called and transmitted to the transmission channel. As will be clear from the pulses indicated in FIG. 2B, the command value diminishes constantly during the four illustrated successive scanning cycles. This results, as will be clear from the pulses shown in FIG. 2C, in a decrease of the number of pulses emitted to the transmission channel, appearing with a corresponding time delay, and which indicate respective larger units. Thus, already during the fourth scanning cycle, and immediately thereafter, no pulses indicating larger units are transmitted during successive transmission cycles.

If, for example, a missile is to be guided with the represented command transmission, each command value, determined during the individual scanning cycles, indicates, for example, the rotation of the velocity vector of the missile through a certain angle in order for the missile to be able to maintain a predetermined flight path. Since the command values diminish continuously in the four successive scanning cycles illustrated in FIG. 2, the sizes of the angles through which the velocity vector of the missile is to be turned in a time associated with each individual scanning cycle should decrease correspondingly. Actually, however, the missile receives only the pulses shown in FIG. 2D through the transmission channel, and which indicate, for example, in the illustrated representation, a rotation of the velocity vector of the missile through an angle corresponding to a command value "7".

During the first three scanning cycles, the missile therefore is so influenced that its velocity vector is turned, in each case, through the same angle, which corresponds to a command value of "7" per scanning cycle. Since the actual command values, however, are already smaller during the third and fourth scanning cycles than the command value "7", the velocity vector of the missile has already been turned too far by a certain angle in the first three scanning cycles. However, this is compensated by the transmission cycles appearing during the fourth scanning cycle and immediately thereafter, since the missile maintains its present flight position due to the absence of pulses represented by larger units, through a certain rotation of the velocity vector is still desired by the command value appearing during the simultaneous scanning cycle.

Due to the kinematics of the missile, an integration of all command values occurs, so that all command values determined during certain scanning cycles at a ground station are actually executed by the missile during a finite time, even though a much coarser pulse raster is used, for the transmission channel, than the pulse raster or screen required and actually used for distinguishing individual command values at the ground station.

Although the invention method has been explained by the example of a guided missile, the method may be applied with the same advantages wherever transmission channels with a low transmission capacity are available and the commands are to be transmitted with optimum security against interference.

What is claimed is:

1. A method of transmitting cyclically formed commands, in the form of individual pulses, over a transmission channel which is restricted in its transmission capacity, security against interference, or both, comprising the steps of forming each command as a series of pulses each having a unit command value and whose total number represents the command; uniformly distributing the series of pulses in each of successive equal length scanning cycles each having the same possible maximum number of pulses and with the number of pulses of such series in each scanning cycle being not greater than such possible maximum number; transmitting commands over successive equal length transmission cycles whose length is less than that of the scanning cycles; counting the number of scanning cycle pulses appearing during a transmission cycle; responsive to the number of pulses counted in a transmission cycle attaining a first preset number, forming and transmitting a command unit whose command value weight is equal to that of a second preset number of the series of pulses; and subtracting said second preset number from the number of counted pulses while continuing counting of the scanning cycle pulses; whereby, during each transmission cycle, a command unit is transmitted only if the number of pulses counted during the transmission cycle is at least equal to such first preset number.

2. A method of transmitting cyclically formed commands, as claimed in claim 1, in which the balance of scanning cycle pulses remaining within a transmission cycle after formation of a larger command unit is added to the number of pulses counted in the respective following transmission cycle.

3. A method of transmitting cyclically formed commands, as claimed in claim 1, in which the scanning cycle pulses appearing during a transmission cycle are distributed substantially uniformly throughout such transmission cycle.

4. An apparatus for transmitting cyclically formed commands, in the form of individual pulses, over a transmission channel which is restricted in its transmission capacity, security against interference, or both, comprising, in combination, first means forming each command as a series of pulses each having a unit command value and whose total number represents the command; cyclically operable second means connected to said first means and uniformly distributing the series of pulses in each of successive equal length scanning cycles each having the same possible maximum number of pulses and with the number of pulses of said series and each scanning cycle being not greater than such possible maximum number; a counter connected to said second means and continuously counting said pulses throughout transmission of the command; cyclically operable third means connected to said counter and providing successive equal length transmission cycles whose length is less than that of said scanning cycles; fourth means connected to said counter and operable, responsive to the number of pulses counted in a transmission cycle attaining a first preset number, to form and transmit a command unit whose command value weight is equal to that of a second preset number of said series of pulses whereby, during each transmission cycle, a command unit is formed only if the number of pulses counted during the transmission cycle is at least equal to said first preset number; and means transmitting said command units to a command transmission channel.

5. An apparatus for transmitting cyclically formed commands, as claimed in claim 4, in which said first means includes an input buffer; said second means comprising a first gate circuit; said counter being a forward-backward counter.

6. An apparatus for transmitting cyclically formed commands, as claimed in claim 5, in which said input buffer is connected to the forward-counting input of said counter; said fourth means including a second gate circuit connected to said counter and to said transmitting means.

7. An apparatus for transmitting cyclically formed commands, as claimed in claim 6, including an output amplifier connected between such second gate circuit and said transmitting means; a restoring buffer connecting the output of said second gate circuit with a backward-counting input of said counter; and a common timing stage controlling said input buffer, said first gate circuit, said second gate circuit and said restoring buffer; the timing sequences supplied to the individual components being geared down relative to each other in a predetermined manner.

8. An apparatus for transmitting cyclically formed commands, as claimed in claim 7, in which said command transmission channel is a wireless channel for transmitting guiding signals from a ground station to a missile.

* * * * *